United States Patent Office 3,538,068
Patented Nov. 3, 1970

3,538,068
POLYETHYLENE COMPOSITIONS CONTAINING A CHARGE-TRANSFER COMPLEX OF AN AROMATIC AMINE AND A HALOQUINONE
Minoru Morita and Misao Hanai, Yokohama-shi, Japan, assignors to Showa Densen Denran Kabushiki Kaisha (also known as Showa Electric Wire and Cable Co. Ltd.), Kawasaki-shi, Kanagawa-ken, Japan
Filed Apr. 8, 1969, Ser. No. 814,418
Claims priority, application Japan, Apr. 11, 1968, 43/24,251
Int. Cl. C08d 3/04, 5/00
U.S. Cl. 260—94.9
11 Claims

ABSTRACT OF THE DISCLOSURE

A polyethylene composition of a solid-phase polyethylene base and, as a voltage stabilizer, one or more charge-transfer complexes dispersed uniformly in the polyethylene base in a total quantity of 5 or fewer parts by weight with respect to 100 parts of the base, each charge-transfer complex having an aromatic amine of specific character as an electron donor and a haloquinone of specific character as an electron acceptor. Such a polyethylene composition has a substantially improved withstand-test voltage characteristic.

BACKGROUND OF THE INVENTION

This invention relates to polyethylene compositions having improved withstand-test voltage characteristic, and particularly to such polyethylene compositions suitable for use as insulating materials of high-voltage cables.

Polyethylenes have usually been used as insulating materials of high-voltage cables of ratings of the order of kilovolts or of high-voltage apparatuses because of the small dielectric constant and dielectric tangent thereof and high dielectric strength thereof.

Further, it has been said that the real dielectric strength of a polyethylene is 500–700 kv./mm., but in practice, it has been used with a dielectric strength of less than this real strength because it has a small impulse withstand-test voltage, and dielectric breakdown thereof occurs at a comparatively low potential gradient.

It is considered that this reduction of the dielectric strength is caused by mechanical strain which is produced by thermal hysteresis in the manufacturing process, foreign matters admixed with the polyethylene, voids existing in the boundary surface of the semiconductive layer, minute voids in the polyethylene, etc.

It is considered that some of these causes of reduction of the dielectric strength can be eliminated by improvements of the working condition, but it is impossible to eliminate substantially minute voids which are invisible to the naked eye, and by which the impulse dielectric breakdown value, thereof is reduced.

It has been confirmed experimentally that the dielectric breakdown is caused by the presence of these voids in the following manner.

(1) Ionization of gas molecules in the voids.
(2) Occurrence of dendritic discharge traces—
 (a) impact of high energy electrons or ions accelerated by the electric field to molecules of polyethylene,
 (b) temperature elevation of polyethylene by discharge,
(3) Growth of the trees—
 (a) decomposition of the polyethylene and formation of low molecules of the same by chemically active gases (gas is produced),
 (b) formations of double bond and cross-linkages,
(4) Dielectric breakdown.

Accordingly, it is highly important to prevent occurrence and growth of the trees in order to improve the dielectric strength of the polyethylene.

From such considerations, the following process is herein provided for the object of improving the withstand-test voltage of polythylenes.

(1) Preventing occurrence of voids of air by molding the polyethylene is an inert gas.
(2) Adding thereto an antioxidant having an especially excellent treeing resistance characteristic selected from ordinary antioxidant.
(3) Adding thereto additives capable of forming a resonance structure by capturing high-energy electrons and of discharging the electrons by lowering the energy, such as halogenated naphthalenes.

SUMMARY OF THE INVENTION

This invention, which is based on considerations differing from those of the aforementioned known processes, resides in the selection of additives which can prevent occurrence of trees in insulating materials, and which are used as voltage stabilizers of polyethylene, and more particularly resides in polyethylene compositions characterized in that charge-transfer complexes based on aromatic amines as an electron donor and haloquinones as an electron acceptor are dispersed uniformly in insulating materials based on solid phase polyethylene.

The nature, details, and utility of the invention will be more clearly apparent from the following detailed description beginning with general considerations and concluding with specific examples of practice constituting preferred embodiments of the invention when read in conjunction with the accompanying drawing.

DETAILED DESCRIPTION

Figure 1:
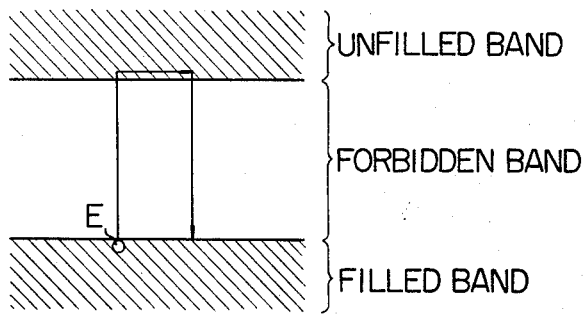
FIG. 1 is a diagrammatic sectional view indicating the movement of electrons having discharge energy at the inside of energy bands of semiconductors and insulating materials.

According to the band theory of semiconductors, the energy condition of electrons in molecules of semiconductors or insulating materials is generally indicated, as shown in FIG. 1, by a filled band which is fully filled with electrons and is nonconductive, a forbidden band having a higher energy level than the first band and not having any electrons (in practice, this band has only a few trapped electrons), and a conductive (unfilled) band having an even higher energy level than the band having freely movable electrons. And, insulating materials have a width of forbidden band of more than 2 ev., but, as the energy of the electrons by discharge in insulating materials is more than 3–10 ev., the electrons (E) in the filled band can be excited by this energy and elevated to the energy level of the conductive band when discharged and can discharge energy of the width of the forbidden band when they are lowered to the energy level of the basic condition, whereby the structural molecules of the insulating materials are destroyed (the energy of the c—c bond being 3.58 ev., and the energy of C–H being 4.21 ev.).

Accordingly, it is considered that in order to prevent occurrence of dielectric breakdown, it is necessary that electrons be captured on the way to the conductive band, and when they are lowered to the basic condition, the energy is lowered to an energy level lower than the bond energy of polyethylene molecules.

This invention contemplates utilizing the aforementioned considerations in the following manner.

Figure 2:
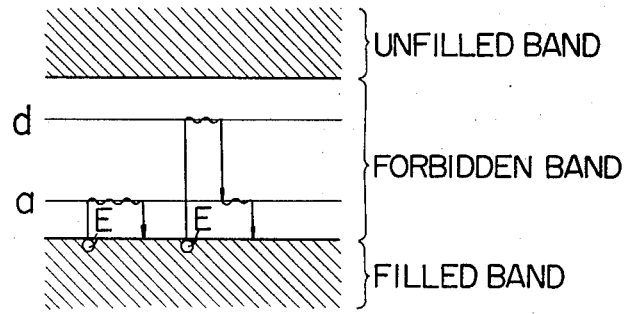
FIG. 2 is a similar view indicating the movement of electrons having discharge energy at the inside of energy bands of insulating materials containing charge transfer-complexes.

This invention resides in applying the band theory of semiconductors to insulating materials, and more particularly resides in forming a level (d), (a) equal to the impurity level of a semiconductor in a polyethylene, as shown in FIG. 2, by mixing charge-transfer complexes based on electron donor (D) and electron acceptor (A) uniformly into a solid-phase polyethylene to prevent formation of high electric field and to prevent direct impact of high energy electrons E on polyethylene molecules by capturing them (E) temporarily at the place.

Charge-transfer complexes used in the compositions of this invention are stabilized by resonance of electron donors (D) and electron acceptors (A) in the form of $$DA \rightleftarrows D^+ - A^-$$

and also by resonance of $D^+ - A^-$ in the form of

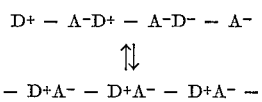

That is to say, the molecular orbital of A molecule is placed on the molecular orbital of B molecule, and then the electrons are conducted, and the electrons to which high energy has been added and transferability to conductive band has been imparted are captured by the complexes and move in the complexes. While they are being moved, the energy, thereof is consumed, and then the energy is lowered to the low-energy level of the complexes, the electrons then being lowered to the base condition.

According to the theory, such advantages can also be confirmed by mixing other semiconductors such as carbon black. However, the semiconductors except the complexes form large and rough particles, and are insoluble in polyethylene, so that in practice the characteristics thereof lower the withstand-test voltage.

Charge-transfer complexes based on aromatic amines as an electron donor and haloquinones as an electron acceptor can be used in this invention. As a result, since the complexes based on plane cyclic structures have many π electrons available for conducting electrons, and the orbitals of these electrons can be easily placed one above another, these charges can easily be transferred, and further release and acceptance of energy are stabilized by the cyclic structures.

The amines used as electron donor in this invention have a hydrophilic amino radical or imino radical, so that they elevate the wetting characteristics of polyethylene, create ion conduction slightly in polyethylene and elevate the withstand-test voltage further.

On the other hand, haloquinones used as electron acceptor in this invention generally have, by themselves, less solubility with respect to polyethylene. However, the haloquinones in the form of complexes with aromatic amines can be mixed into polyethylene in various proportions.

Thus, the complexes used in this invention have excellent solubility or compatibility in or with polyethylene and transferability in polyethylene, and when partial defects, such as a small amount of voids, occur in the polyethylene, they bleed out through surrounding walls, whereby the occurrence of corona discharge on the inside are prevented.

Amines are generally toxic, so that the use of amines alone gives rise to the problem of production of vapor in the process of molding. However, the complexes used in this invention have higher vapour pressure than the amines by themselves, so that the use of the complexes does not give rise to the aforementioned problem.

Aromatic amines constituting charge-transfer complexes used in this invention can be represented by the general formula

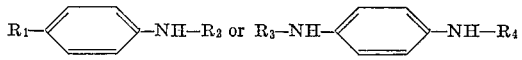

in which $R_1$ is selected from the group of H, $CH_3$, COOH,

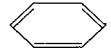

$NO_2$, and Br, $R_2$ is selected irrespective of the $R_1$ from the group of H, $CH_3$, and

and $R_3$ and $R_4$ are the same or different and are selected from the group of H,

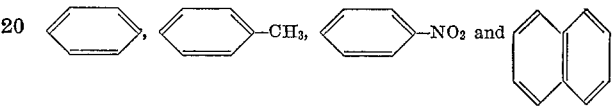

Examples of such aromatic amines are aniline, p-nitroaniline, p-amino-benzoic acid, p-phenylaniline, p-chloroaniline, p-methylaniline, p-methoxyaniline, N-methylaniline, N - methyl - p - bromoaniline, phenyl-α-naphthyl amino, phenyl-β-naphthylamine, p-phenylene-diamine, N-phenyl-p-phenylenediamine, N,N'-di-phenyl-p-phenylenediamine, N-p-tolyl-N'-phenyl-p-phenylenediamine, N,N'-di - o-nitrophenyl-p-phenylenediamine, N-p-nitrophenyl-p-phenylenediamine, N-p-tolyl-p-phenylenediamine, N, N'-di-o-tolyl-p-phenylenediamine, and N, N'-di-β-naphthyl-p-phenylenediamine, and the like.

Haloquinones used as electron donor can be represented by the general formula

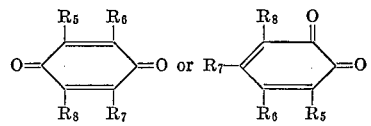

(in which $R_5$, $R_6$, $R_7$ and $R_8$ are the same or different radicals selected from the group of halogens, H, and CN, at least two of them being the same halogen atoms). Examples of such haloquinone are o-chloranil, p-chloranil, o-fluoranil, p-fluoranil, o-bromanil, p-bromanil, o-iodoanil, 2,3 - dibromo - 5,6 - dicyano-p-benzoquinone, 4,5-dichloro-o-benzoquinone, 4,5-dichloro-p-benzoquinone, 2,3-dichloro-p-benzoquinone, 2,3 - dibromo-p-benzoquinone, 2,3-diiodo-p-benzoquinone, 2,3-difluoro-o-benzoquinone, 2,6-dibromo-o-benzoquinone, 2,3-diiodo-p-benzoquinone, 2,5 - difluoro-o-benzoquinone, trichloro-p-benzoquinone, tribromo-p-benzoquinone, triiodo-p-benzoquinone, and trifluoro-p-benzoquinone, and the like.

Charge-transfer complexes used in this invention are obtained in the form of precipitation or solution by mixing solutions which are made by dissolving each of the electron donor and electron acceptor individually in organic solvents such as benzene, methylene chloride, chloroform and alcohols, or by dissolving the electron acceptor into the molten electron donor which has been prewarmed. If desired, the complex can be produced in site from an aromatic amine and haloquinone introduced separately into the polyethylene to form the complex.

In this process, charge-transfer complex products can be confirmed by the color, the occurrence of charge-transfer absorption bands, the charge of electric characteristic, etc.

Charge-transfer complexes used in this invention are obtained theoretically by the reaction of the same moles of the electron donor and electron acceptor, but the aromatic amines function also as an antioxidant in the polyethylene by themselves, and as an assisting agent for accelerating the solubility of charge-transfer complexes in the polyethylene, so that the products obtained by the use of the electron donor with a little excess amounts in the latter process of the aforementioned two processes are especially advantageous.

The charge-transfer complexes thus obtained can be mixed with polyethylene in suitable proportions by the conventional processes, preferably about 0.1–5 parts by weight thereof being added to 100 parts by weight of polyethylene.

A polyethylene used in this invention is a solid polyethylene obtained by the high-pressure process, the middle-pressure process, or low-pressure process generally used for molding, and, if necessary, small amounts of carbon black, pigment, antioxidant, heat stabilizer antiozonant, etc., can be added to the polyethylene, the polyethylene thus obtained also being usable. The polyethylene can be polyethylene containing small amounts of comonomer or comonomers such as lower α-olefines such as propylene and isobutene, and vinylacetate in amount of up to 10% by weight of the copolymer.

Further, charge-transfer complexes used in this invention have almost no preventive effect on the decomposition of peroxides, so that the polyethylene can be used as a cross-linkable polyethylene composition by adding small amounts of cross-linking peroxides, such as di-α-cumyl peroxide, 2, 5-bis (t-butyl peroxy)-2, 5-dimethyl hexane, etc., to the polyethylene.

Furthermore, transferability of charge-transfer complexes can be accelerated, and the characteristic of withstand-test voltage can be further elevated by mixing high insulating oil as well as the charge-transfer complexes into the polyethylene.

In order to indicate still more fully the nature and utility of the invention, the following specific examples of practice constituting preferred embodiments thereof and results are set forth it being understood that these examples are presented as illustrative only and that they are not intended to limit the scope of the invention.

The characteristic voltages in the following examples were determined by the procedure of Kitchin and Pratt, [D. W. Kitchin and O. S. Pratt; IEEE Trans., 81, 8 (1962)], which procedure is as follows. A ground needle having definite dimension is inserted into a heatsoftened long strip sample from the end surface of the same, and left thus for twenty hours. Then constant alternating voltage is applied, in insulating oil, between the root end of needle and the surface of the plate electrode, the distance therebetween being maintained at 6 inches. The sample is then observed through a microscope. The voltage at which the occurrence of trees is observed in four out of eight samples is taken as the characteristic voltage.

A better relationship exists between the characteristic voltage and the withstand-test voltage characteristic of polyethylene-insulated wire. It is confirmed that this relationship also exists in the case of polythylene containing charge-transfer complexes equally in the case of conventional polyethylene.

EXAMPLE 1

N,N'-diphenyl p-phenylenediamine was melted by warming, and the same amount of p-chloranil was dissolved therein. The formation of discharge-transfer complexes was confirmed by the green coloration of the melt.

The 100 parts by weight of commercial polyethylene having a melt index of 0.25 g/10 min. and density of 0.95 [DFE#6603, trademark of Nippon Unicar Co.] and 0.5 part by weight of charge-transfer complex were mixed uniformly by means of a heat-roll heated at 160–200° C., and the mixture was formed into a sheet having 6-mm., thickness by heat-press, and then a sample having 25-mm. length and 10-mm. width was punched out from the sheet, and characteristic voltage thereof was determined.

The results are shown in Table 1. Further, 0.5 part by weight of N,N'-diphenyl-p-phenylenediamine and 0.5 part by which of p-chloranil were independently mixed into DFE#6603 polyethylene, and each of the mixtures was respectively formed into a sheet in the same manner as the first sheet. Then samples were similarly punched out. The values of characteristic voltage of these samples are respectively shown in the columns headed by Reference No. 1 and Reference No. 2 in the Table 1. These values are shown for comparison.

Table 1

| | Characteristic voltage (kv.) |
|---|---|
| Example 1 | 38 |
| Reference No. 1 | 25 |
| Reference No. 2 | 28 |

EXAMPLE 2–EXAMPLE 5

Charge-transfer complexes were obtained from aromatic amines and haloquinones shown in Table 2 by the same procedure as in Example 1.

0.5 part by weight of each of these complexes was respectively mixed into 100 parts by weight of DFD#6603 polyethylene by the same procedure as in Example 1, and each of the mixtures was respectively formed into a sheet having a 6-mm. thickness, and then the characteristic voltages of these samples were respectively determined. The results are shown in Table 2.

TABLE 2

| Example | Aromatic amine | Haloquinone | Aromatic amine/ haloquinone | Colour of complex | Characteristic voltage (kv.) |
|---|---|---|---|---|---|
| 2 | Aniline | 2,3-dibromo-5,6-dicyano-p-benzoquinone | 2 | Green | 39 |
| 3 | Phenyl-α-naphthyl-amine | p-Chloranil | 2 | Brown | 46 |
| 4 | N,N'-di-β-naphthyl-p-phenylene-diamine | do | 2 | Dark green | 42 |
| 5 | do | p-Bromanil | 2 | do | 38 |

EXAMPLE 6–EXAMPLE 14

0.5 part by weight of each of charge-transfer complexes shown in Table 3 was mixed uniformly into 100 parts by weight of DFD#6603 polyethylene, and each of the resulting mixtures was formed into a sheet having a 6-mm. thickness. The characteristic voltage of each of these samples was determined. The results are shown in the Table 3.

TABLE 3

| | Charge-transfer type complex | | | |
|---|---|---|---|---|
| Example | Aromatic amine | Haloquinone | Aromatic amine/ Haloquinone | Characteristic voltage (kv.) |
| 6 | p-Chloroaniline | p-Iodoanil | 2 | 31 |
| 7 | p-Nitroaniline | o-Chloranil | 2 | 36 |
| 8 | p-Phenylaniline | p-Chloranil | 2 | 31 |
| 9 | N-phenyl-p-phenylenediamine | p-Fluoranil | 1.5 | 30 |
| 10 | p-Phenylene-diamine | p-Chloranil | 2 | 40 |
| 11 | N,N'-di-o-nitro-phenyl-p-phenylene diamine | p-Bromanil | 1.8 | 35 |
| 12 | N,N'-di-o-tolyl-p-phenylenediamine | p-Chloranil | 2 | 42 |
| 13 | N-p-nitrophenyl-p-phenylenediamine | p-Bromanil | 2 | 28 |
| 14 | p-Carboxyaniline | do | 2 | 31 |

EXAMPLE 15

100 parts by weight of DFD#6603 polyethylene, 0.5 part by weight of N,N'-diphenyl-p-phenylenediamine-p-chloranil (weight ratio 2) and di-α-cumyl peroxide were mixed uniformly by means of a heat-roll at 120° C., and the mixture was heated by press heating at 160° C. for 15 minutes, and whereupon a cross-linked polyethylene sheet having a 4-mm. thickness was obtained. The characteristic voltage of this sheet was 45 kv. For the purpose of comparison, cross-linked polyethylene sheet having a 6-mm. thickness obtained of the same procedure except that N,N'-diphenyl-p-phenylenediamine was not added was produced. The characteristic voltage for this reference sample, Reference No. 3, was 34 kv.

|  | Characteristic voltage, kv. |
|---|---|
| Example 15 | 45 |
| Reference No. 3 | 34 |

What is claimed is:

1. A polyethylene composition of improved withstand-test voltage characteristic comprising a solid-phase polyethylene base and, as a voltage stabilizer, at least one charge-transfer complex dispersed uniformly in said polyethylene base in a total quantity of from 0.1 to 5 parts by weight with respect to 100 parts by weight of the polyethylene base, each charge-transfer complex having, as an electron donor, an aromatic amine selected from the group consisting of aromatic amines representable by the general formula

where $R_1$ is a member selected from the group consisting of H, $CH_3$, $OCH_3$, COOH,

$NO_2$, and Br, and $R_2$ is a member selected, irrespective of $R_1$, from the group consisting of H, $CH_3$, and

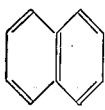

and aromatic amines representable by the general formula

where each of $R_3$ and $R_4$ is selected, irrespective of the other, from the group consisting of H,

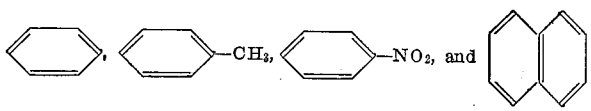

and, as an electron acceptor, a haloquinone selected from the group consisting of haloquinones representable by the general formulas

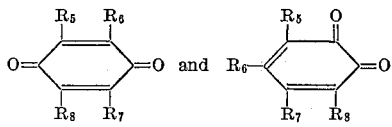

(where each of $R_5$, $R_6$, $R_7$, and $R_8$ is a member selected, irrespective of the others, from the group consisting of halogens, H, and CN, and at least two of $R_5$, $R_6$, $R_7$ and $R_8$ consist of the same halogen atom).

2. A polyethylene composition as claimed in claim 1 in which said electron donor is an aromatic monoamine representable by said general formula

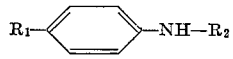

3. A polyethylene composition as claimed in claim 1 in which said electron donor is an aromatic diamine representable by the general formula

4. A polyethylene composition as claimed in claim 2 in which said aromatic monoamine is representable by the general formula

5. A polyethylene composition as claimed in claim 2 in which said aromatic monoamine is representable by the general formula

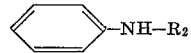

6. A polyethylene composition as claimed in claim 5 in which said aromatic monoamine is phenyl-α-naphthylamine.

7. A polyethylene composition as claimed in claim 2 in which said electron acceptor is p-chloranil.

8. A polyethylene composition as claimed in claim 2 in which said electron acceptor is p-bromanil.

9. A polyethylene composition as claimed in claim 3 in which said aromatic diamine is di-β-naphthyl-p-phenylene diamine.

10. A polyethylene composition as claimed in claim 9 in which said electron acceptor is p-chloranil.

11. A polyethylene composition as claimed in claim 1 in which said solid-phase polyethylene base contains a small quantity of peroxides for bridging.

References Cited
UNITED STATES PATENTS

| | | | |
|---|---|---|---|
| 3,190,859 | 6/1965 | Wei et al. | 260—94.9 XR |
| 3,395,137 | 7/1968 | Reindle et al. | 260—94.9 XR |

JOSEPH L. SCHOFER, Primary Examiner

W. F. HAMROCK, Assistant Examiner

U.S. Cl. X.R.

260—80.78, 87.3, 88.2, 96, 41; 252—65